(12) United States Patent  
Perkins et al.

(10) Patent No.: US 8,123,281 B2  
(45) Date of Patent: Feb. 28, 2012

(54) PROACTIVE AERODYNAMIC TRUCK TRAILER SHROUD

(75) Inventors: Patricia M. Perkins, Fort Wayne, IN (US); James C. Bradley, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 187 days.

(21) Appl. No.: 12/366,289

(22) Filed: Feb. 5, 2009

(65) Prior Publication Data

US 2010/0194143 A1   Aug. 5, 2010

(51) Int. Cl.
*B60J 1/00* (2006.01)

(52) U.S. Cl. .................................. 296/180.2; 296/180.1

(58) Field of Classification Search ............... 296/180.1, 296/108.2, 180.3, 180.4, 180.2; 180/903
See application file for complete search history.

(56) References Cited

U.S. PATENT DOCUMENTS 2,101,793 A  *  12/1937  Field, Jr. .................... 280/423.1
(Continued)

*Primary Examiner* — Glenn Dayoan
*Assistant Examiner* — Pinel Romain
(74) *Attorney, Agent, or Firm* — Jeffrey P. Calfa; Mark C. Bach

(57) ABSTRACT

A power or motive source for an extensible fairing for an articulated motor vehicle is based on a fluid power system. The fluid power system is disposed on the vehicle to be exposed to airflow around the vehicle resulting from forward movement of the vehicle. A coupling mechanism responsive to exposure of the fluid power system to airflow for extending and retracting the extensible fairing responsive to changes in vehicle speed.

13 Claims, 9 Drawing Sheets

U.S. PATENT DOCUMENTS

| | | | |
|---|---|---|---|
| 3,711,146 A | | 1/1973 | Madzsar et al. |
| 3,834,752 A | * | 9/1974 | Cook et al. .................. 180/309 |
| 4,172,506 A | * | 10/1979 | Terry .......................... 180/125 |
| 4,379,582 A | * | 4/1983 | Miwa ........................ 296/180.5 |
| 4,611,847 A | | 9/1986 | Sullivan |
| 4,746,160 A | | 5/1988 | Wiesemeyer |
| 4,824,165 A | | 4/1989 | Fry |
| 4,904,015 A | | 2/1990 | Haines |
| 5,078,448 A | | 1/1992 | Selzer et al. |
| 5,222,438 A | | 6/1993 | Ende |
| 5,249,837 A | | 10/1993 | Luttrell |
| 5,511,847 A | * | 4/1996 | Weisbarth et al. ......... 296/180.1 |
| 5,522,637 A | * | 6/1996 | Spears ....................... 296/180.3 |
| 5,544,931 A | * | 8/1996 | Nelson ...................... 296/180.1 |
| 5,595,419 A | * | 1/1997 | Spears ....................... 296/180.2 |
| 5,603,549 A | | 2/1997 | Chen et al. |
| 6,428,084 B1 | * | 8/2002 | Liss ........................... 296/180.3 |
| 6,742,616 B2 | * | 6/2004 | Leban ......................... 180/116 |
| 6,846,035 B2 | * | 1/2005 | Wong et al. ................ 296/180.1 |
| 6,886,882 B2 | | 5/2005 | Farlow et al. |
| 6,932,419 B1 | | 8/2005 | McCullough |
| 6,986,544 B2 | * | 1/2006 | Wood ......................... 296/180.1 |
| 7,073,845 B2 | * | 7/2006 | Ortega et al. .............. 296/180.3 |
| 7,185,944 B2 | * | 3/2007 | Shahbazi ................... 296/180.1 |
| 7,216,923 B2 | * | 5/2007 | Wong et al. ................ 296/180.2 |
| 7,237,827 B2 | * | 7/2007 | Shahbazi ................... 296/180.1 |
| 7,374,229 B1 | * | 5/2008 | Noll et al. .................. 296/180.2 |
| 7,448,983 B2 | * | 11/2008 | Doering et al. ............... 477/183 |
| 7,712,822 B2 | * | 5/2010 | Pfaff .......................... 296/180.2 |
| 2007/0200390 A1 | * | 8/2007 | Lotarev et al. ............ 296/180.2 |
| 2009/0184539 A1 | * | 7/2009 | Pursley ...................... 296/180.3 |

* cited by examiner

PROACTIVE AERODYNAMIC TRUCK TRAILER SHROUD

BACKGROUND

1. Technical Field

The disclosure relates to active aerodynamic fairings or shrouds for vehicles, and more particularly to a power source for controlling the extension and retraction of such shrouds.

2. Description of the Problem

Aerodynamic drag contributes greatly to fuel consumption by tractors pulling trailers at highway speeds. The gap between the tractor and trailer tends to trap air, creating a low-pressure wake behind the tractor, resulting in a net pressure difference creating drag. It also exposes portions of the front of the trailer to the direct impact of air further contributing to decreased fuel economy. The gap distance between the tractor-trailer combination has been dependent on the position of what is known in the art as a fifth wheel. The fifth wheel is a bearing and serves as a coupling between the tractor and trailer. The position of the fifth wheel is adjusted to accommodate different weight distributions based on the load of the trailer. The gap distance typically varies from about 36 to 48 inches. The drag coefficient and effective frontal area of the trailer is dependent on the gap distance. More specifically, the larger the gap distance, the larger the drag coefficient and exposed frontal area of the trailer, and conversely, the smaller the gap distance, the smaller the drag coefficient.

The gap causes the formation of a turbulent air mass creating a low-pressure wake behind the tractor, decreasing the fuel efficiency of the vehicle. The goal in aerodynamic design is to produce shapes that delay air separation. Maximum efficiency is achieved when airflow remains attached and moves parallel to the side of the vehicle such that air separation from the tractor is reduced and a constant and smooth airflow along the side of the vehicle is achieved.

One solution has been to close the gap between the sides of the cab and the sides of the trailer using cab extenders or fairings. Fixed cab extenders are planar members which extend aft longitudinally from a back end of the tractor substantially parallel with the sides of the tractor and upper fairings which slope upwardly from the cab roof to the front leading edge of the trailer. Ideally, the fixed cab extenders would extend across the entire gap between the tractor and trailer, which, as stated above, typically varies from 36 to 48 inches, to obtain the maximum aerodynamic gain. However, if the fixed cab extenders were configured as described, as the tractor turned relative to the trailer, the trailer could collide with impact and damage the extenders. Various solutions to this problem have been proposed.

Some previously developed fixed cab extenders were positioned to leave substantial clearance between the rearmost vertical edge of the fixed cab extender and a front end of the trailer. This clearance between the front end of the trailer and the fixed cab extenders prevented contact during sharp, typically slow speed turns. Of course, the wider the gap left, the less effective the extender is, though any extension provided some benefit. Other methods of addressing the issue were proposed, including various types of deployable cab extender allowing changing the clearance space between the tractor and trailer at high speeds so that it would fully deployed at highway speeds to improve fuel economy, and retracted at low speeds to allow the tractor trailer truck to maneuver. It was also recognized that a need existed for a cab extender that was adjustable in length to accommodate the variability in spacing encountered between the tractor and trailer.

One previously developed attempt at fulfilling some of these needs is disclosed in U.S. Pat. No. 3,711,146 issued to Madzsar (hereinafter "Madzsar"). Madzsar teaches adjusting the length of the cab extenders based upon a sensed amount of articulation between a tractor and trailer.

U.S. Pat. No. 6,846,035 issued to Wong, et al. provided an adjustable length cab extender disposed in a gap located between a tractor and a trailer. The dynamic cab extender was configurable between a deployed position, a stowed position, and an extended position. In the deployed position, the dynamic cab extender was oriented substantially coplanar with a side of the vehicle in a gap extending between a back end of the tractor and a front end of the trailer. In the stowed position, the dynamic cab extender was stowed behind the back end of the tractor. In the extended position, the dynamic cab extender was oriented substantially coplanar with the side of the vehicle in the gap. A length of the dynamic cab extender when in the extended position exceeds the length of the dynamic cab extender when stowed. Automatic adjustment of the length of the cab extender was provided in response to changes in vehicle speed. This included automatically adjusting a longitudinal length of the dynamic cab extender to selectively position a trailing edge of the dynamic cab extender a selected distance from a front end of the trailer when the sensed speed of the tractor exceeds a selected speed.

SUMMARY

A power source for an extensible fairing for an articulated vehicle is autonomous of the vehicle's engine. The power source is based on fluid power system disposed on the vehicle to be exposed to airflow around the vehicle resulting from forward movement of the vehicle. The fluid power system may take one of several forms including systems for generating rotary mechanical energy or a pneumatic system. A coupling mechanism responsive to exposure of the fluid power system to airflow for extending the extensible fairing. Springs may be used to bias the extensible shrouding toward a retracted position.

Additional effects, features and advantages will be apparent in the written description that follows.

BRIEF DESCRIPTION OF THE DRAWINGS

The contribution to the art believed novel is set forth in the appended claims. The preferred mode of use will best be understood by reference to the following detailed description of an illustrative embodiment when read in conjunction with the accompanying drawings, wherein:

DETAILED DESCRIPTION OF THE INVENTION

Figure 1:
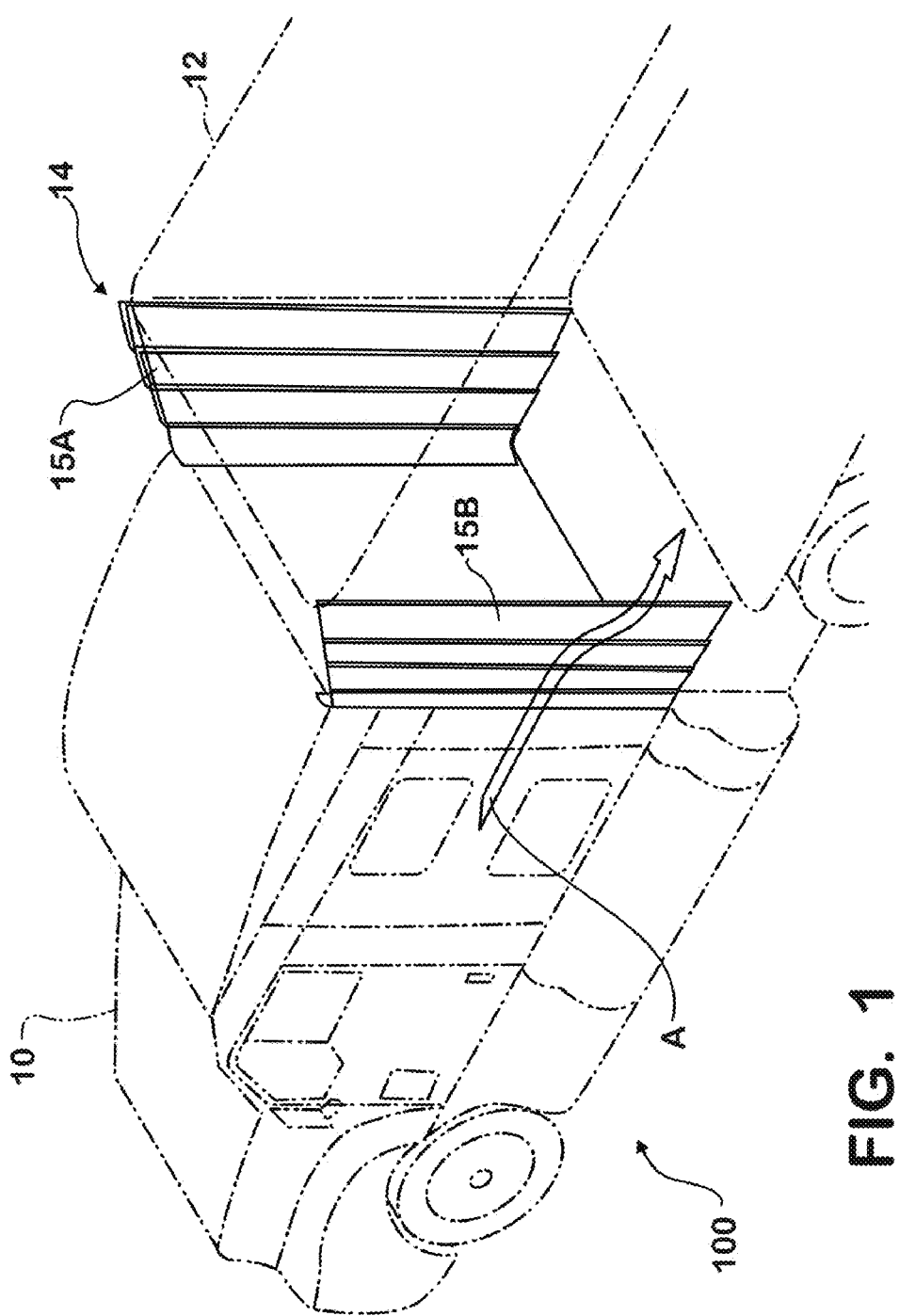
FIG. 1 is perspective view of a shroud system for a truck/trailer combined vehicle where the shroud is deployed to close the cab between the trailer.

Referring now to the drawings and in particular to FIG. 1 a tractor/trailer combination 100 is shown comprising a tractor 10 towing a trailer 12. Disposed on the tractor 10 between the back of a tractor cab 16 and a front wall of the trailer 12 is a shroud system 14. Shroud system 14 includes extensible shrouds/fairings 15A, B, which are shown as deployed. Shrouds 15A, B deploy by extending from the cab 16 toward the front wall of the trailer as the tractor/trailer combination increases in speed. As the shrouds 15A, B extend they progressively close more of the gap between the cab 16 and the trailer 14 and thereby reduce wind resistance by causing air to flow more smoothly along the side of the vehicle as indicated by the letter A. Shrouds 15A, B retract with decreasing speed, anticipating that the operator of the vehicle might be slowing the vehicle in preparation for a turn which could result in the trailer hitting a shroud as the vehicle articulates.

Figure 2A:
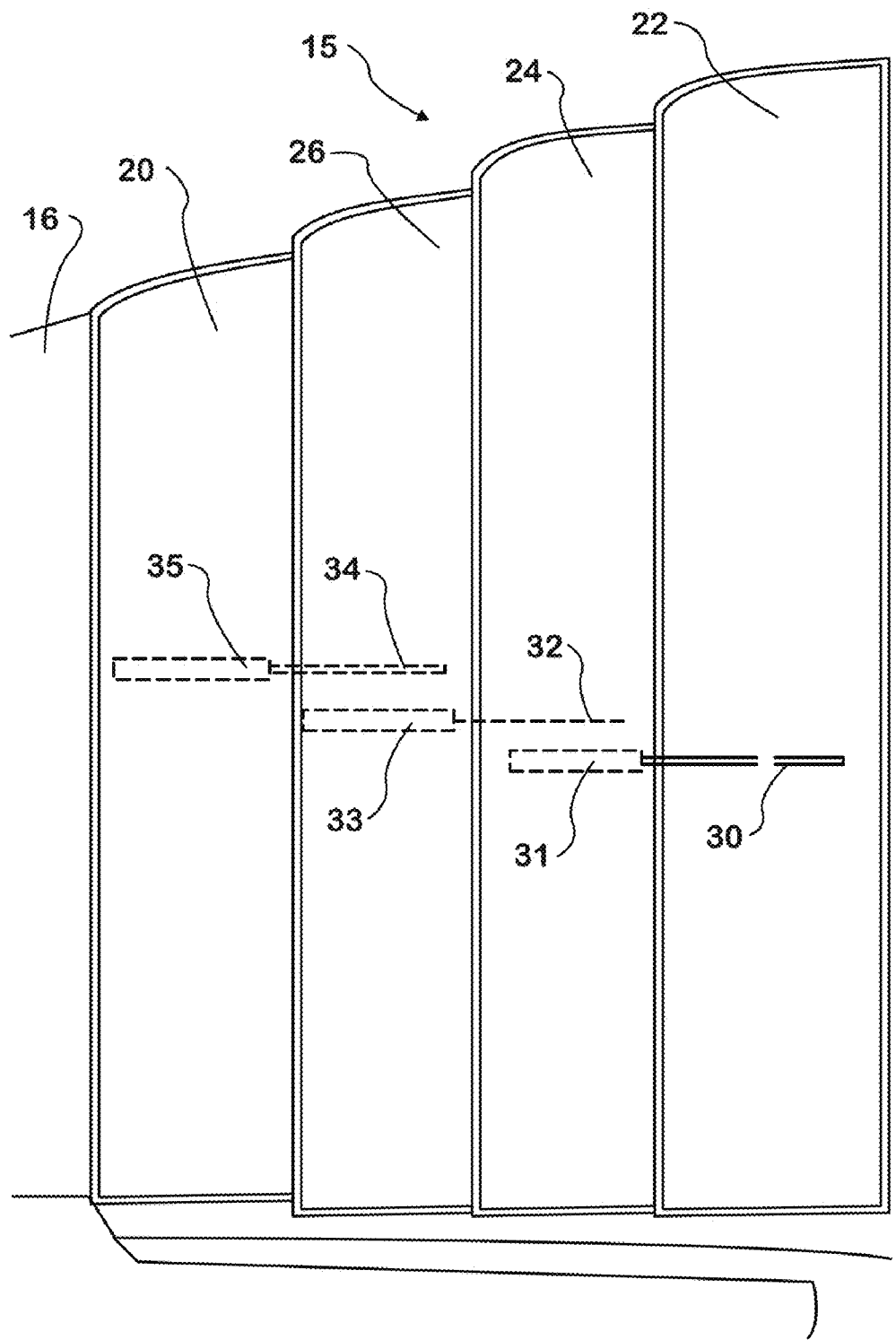
FIGS. 2A and B are schematic illustration of a shroud for one side of the vehicle featuring inside and outside faces of a shroud and its modifications to incorporate a shroud deployment and retraction system.
Figure 2B:
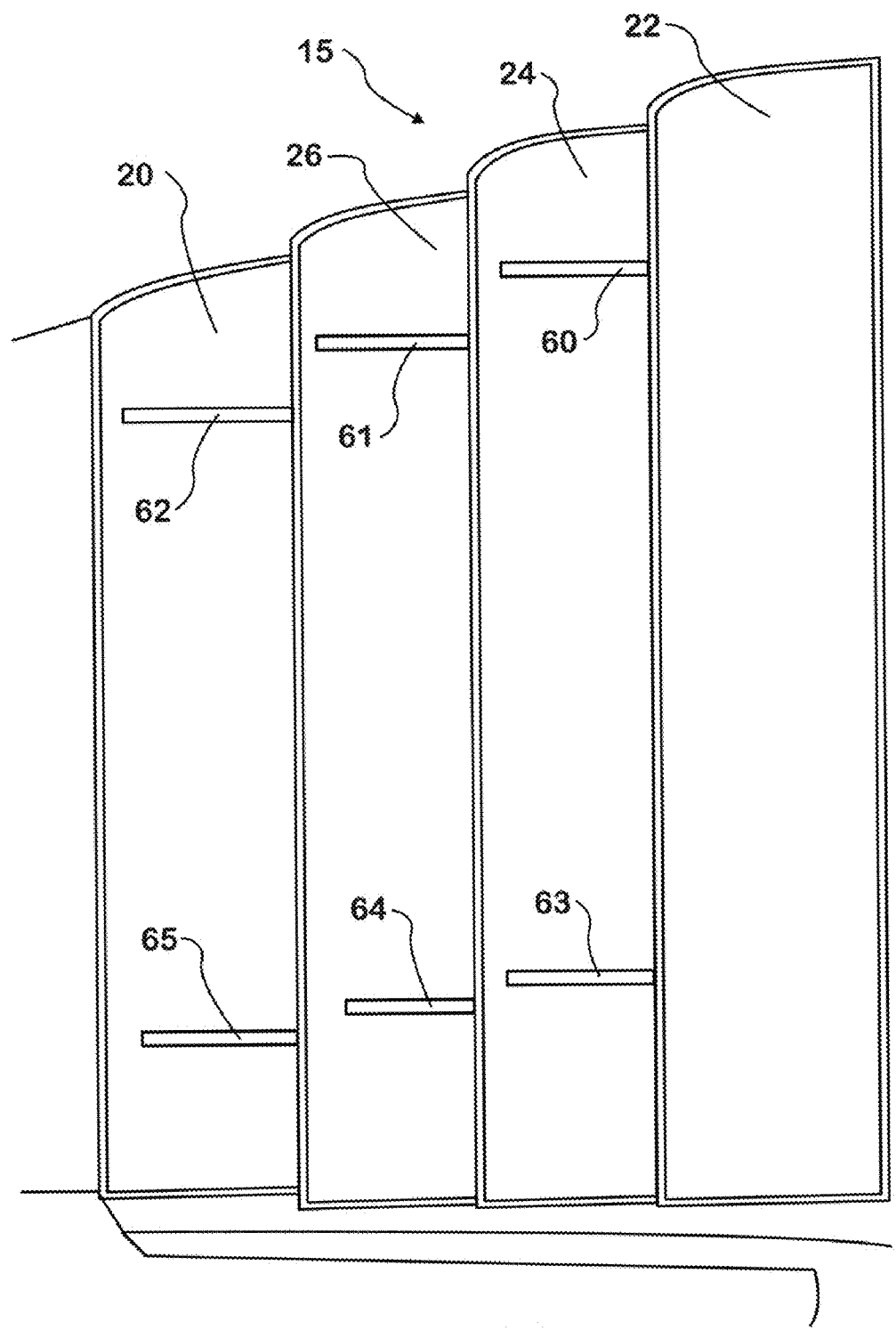

FIGS. 2A-B illustrate a representative segmented, extensible shroud 15 comprising four segments, a base segment 20, a leading segment 22, a first trailing segment 24 and a second trailing segment 26. Segments 20, 26, 24 and 22 are elongated panels oriented with their long axes perpendicular to the ground. In the preferred embodiment each successive segment shows an increase in height from the base segment 20, which is the shortest, to the second trailing segment 26 to the first trailing segment 24 to the leading segment 22 which is the tallest. This is done to accommodate the difference in height of the trailer and the cab. Trailers are typically, though not always taller than cabs. The base segment is attached to the back of cab 16 and in the preferred embodiment is positionally fixed. The leading segment 22 is typically the first segment to be extended upon deployment of the shroud 15, followed by the first trailing segment 24 and lastly the second trailing segment 26. The order in which the segments 26, 24 and 22 are extended and withdrawn depends on the configuration of the particular fluid power system used. The segments nest when the system is stowed with the leading segment 22 falling to the outside relative to the vehicle's longitudinal center line, the first trailing segment 24 being located just to the inside of the leading segment, the second trailing segment 26 being located just to the inside of the first trailing segment and the base segment 20 being the innermost of all the segments.

FIG. 2A illustrates the interior side of a representative segmented shroud 15. A fluid power system (See FIGS. 3A-B) is used to power deployment of the shrouds 15A, 15B. The fluid power system may be implemented in a number of ways. Here, for example, cylinders 31, 33 and 35 receive air to extend shroud segments 22, 24 and 26 as extension arms 30, 32 and 34 are pushed out of the cylinders. Cylinder 35 is mounted to base segment 20 and, upon introduction of air to the cylinder, the air drives an extension arm 34 outwardly from the cylinder. The extension are is connected to segment 26 while the cylinder is mounted to segment 20 and thus segment 26 is extended from segment 20, rearwardly away from the cab 16. Cylinder 35 may include a compression spring to bias extension arm 34 toward a retracted position. Loss of air pressure in cylinder 35 thus would result in retraction of the segment 26. Similarly a cylinder 33, extension arm 32 combination is connected between segments 26 and 20 and a cylinder 31 and extension arm 30 combination is attached between segments 24 and 22. Alternative extension and retraction mechanisms are of course possible, including a crank system based on a wind turbine or an air screw exposed to air flow around the vehicle. Such a rotary power system 270 is illustrated in FIG. 3D. It would generate rotary mechanical energy. Pitch reversal of the blades of the turbine or screw, or use of a reverse gear system 280 would allow such a system to be used to extend or retract the fairings/shrouds 15. Such a system would allow precise positioning of the fairings 15.

The operation of the fluid power controller 156 is described below with reference to FIG. 3B.

FIG. 2B illustrates an outside face of the representative segmented shroud 15. Excluding the base segment 20, the other segments 22, 24 and 26 can be configured to ride on inlay tracks 60, 61, 62, 63, 64 and 65 on relatively trailing adjacent segments, i.e. segments 20 (the base segment), 26 and 24. Segments that deploy relatively further aft are mounted progressively further to the outside of the vehicle relative to a longitudinal center line. When retracted segments 20, 26 and 24 are nested within segments 26, 24 and 22, respectively.

Figure 3A:
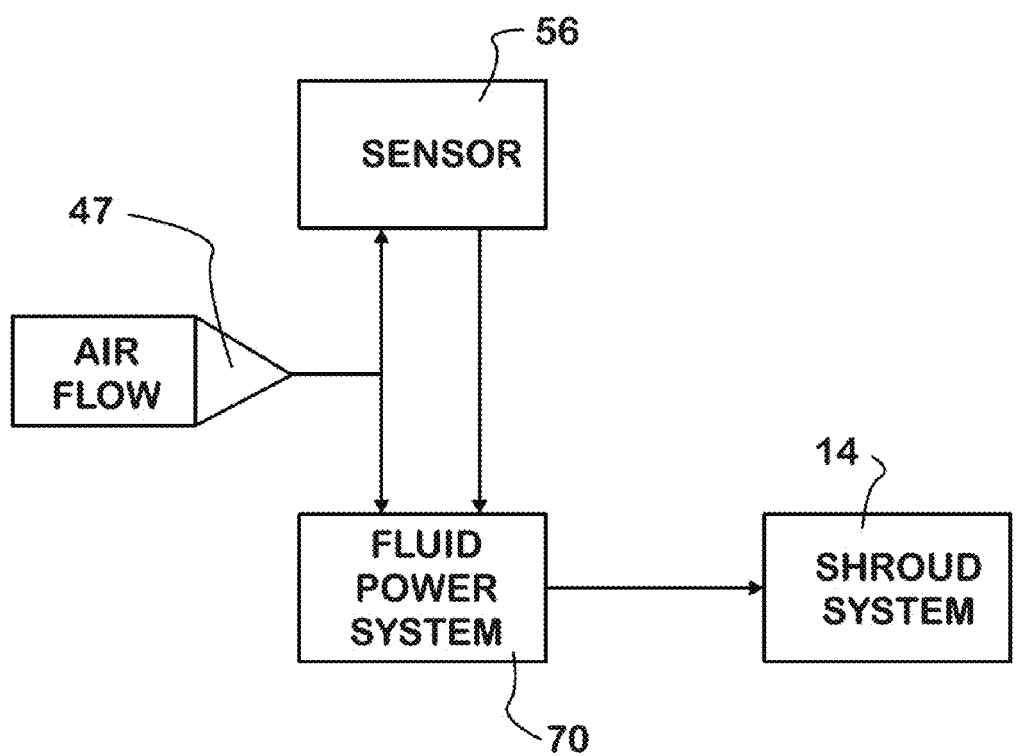
FIGS. 3A-C are schematics for a power system for a segmented, extensible aerodynamic fairing for an articulated vehicle.

FIG. 3A is a simplified schematic of an automatically deploying shroud system for improving vehicle aerodynamics. In a preferred form the system operates using air flowing around the vehicle and thus the system is essentially passive. Air flow 47 can be used both as an indicator of vehicle speed, determined by a sensor 56, and as a power source for the fluid power system 70. A fluid power system responsive to the sensor 56 controls the degree of deployment of the shrouds 15A, B. When the truck is operating at slow speed the shroud system remains nested. When the truck slows to execute a turn the shroud system retracts. As speed increases the sensor activates the fluid power system 70 and the shrouds are extended to close the gap between cab and trailer, thereby improving the aerodynamics of the truck. There are a number of ways the fluid power system 70 can be made to utilize air flow around a vehicle. In some embodiments the sensor 56 may be merged with the fluid power system 70 to achieve the greatest degree of passivity. For example, the fluid power system 70 may be a mechanically cranked system driven by a wind driven fins. At speeds above a certain threshold, the fins may be set at a pitch to extend the shrouds. At speeds falling below the threshold the fins' pitch may be reversed to drive the system in the opposite direction. When the shrouds 15A, B are fully extended or retracted the fins may be set to neutral. A ram air or pressure plate system would in effect be its on air speed indicator with the degree of shroud extension following purely from frontal air pressure on the vehicle. Spring resistance may be used with such a system to limit the degree of extension of the shrouds 15A, B and to bias the system toward a retracted state.

Figure 3B:
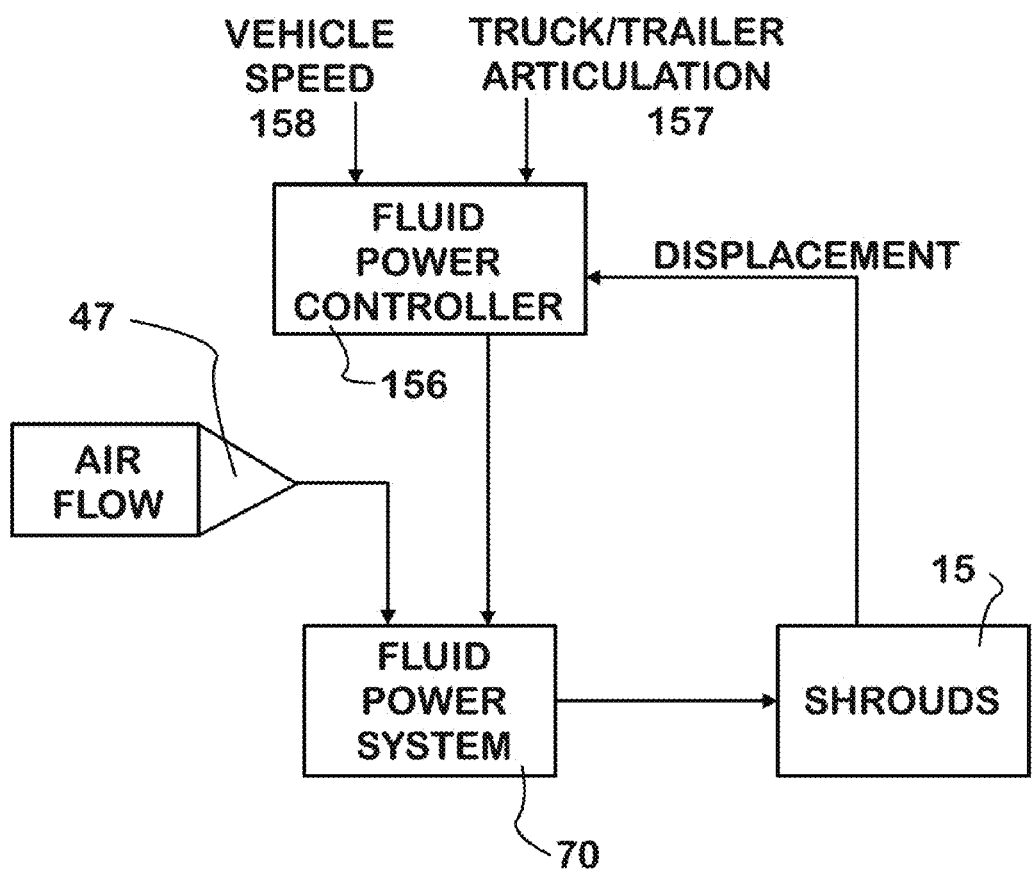

FIG. 3B introduces additional nuances to the control system by providing a fluid power controller 156 which monitors shroud extension (displacement), the degree of truck to trailer articulation 157 and directly measure vehicle speed. Vehicle speed measurements taken from wind speed may be dependent upon air density and wind direction and thus deployment speed could increase at low air density as might be encountered at high altitudes or if the vehicle enjoyed a following wind. Deployment speeds would decrease if the vehicle encountered a head wind. If vehicle speed measurements are received from another source, for example a drive shaft tachometer 158, this issue does not arise. A more nuanced, active control scheme can be implemented where a fluid power controller 156 can be programmed to take direct account of the degree of extension of the shrouds, directly measured vehicle speed and the degree of truck/trailer articulation 157. For example, if actual vehicle articulation is measured it is possible to configure the fluid power system 70 to withdraw the shroud on only the side of the vehicle affected. In addition, vehicle compressed air may be tapped to provide air 47 rather than introducing a drag inducing modification to the vehicle. However, the modifications introduced for this embodiment require interaction with the vehicle's electronic control system at the cost of some additional complication to the vehicle. Employment of a control system would allow the easy addition of valves to the fluid power system which in turn would allow control over the order in which segments were extended or retracted.

Figure 3C:
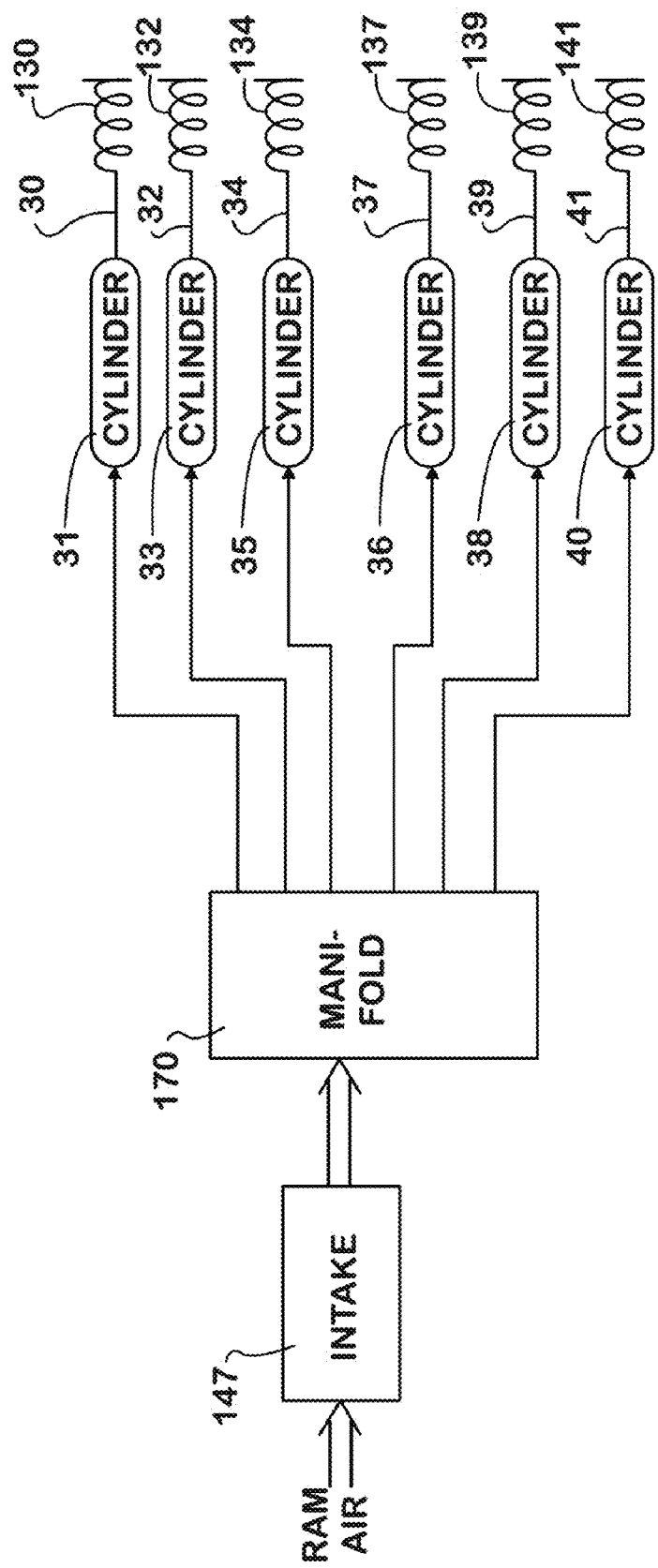
Figure 3D:
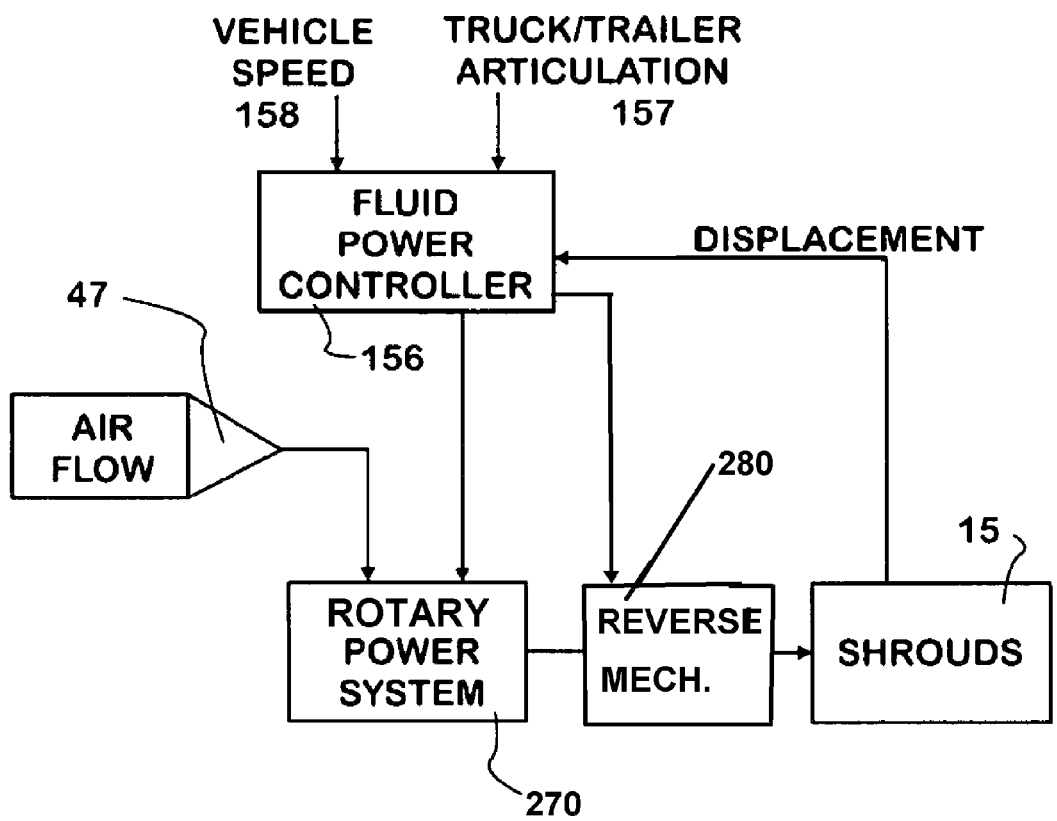
FIG. 3D is a view of a rotary power system.

It is also possible to configure the system to be completely passive. In the embodiment of FIG. 3C a ram air induction system 147 feeds air to a manifold 170 which directs air into each of six cylinders 31, 33, 35, 36, 38 and 40. Increasing air pressure in cylinders 31, 33, 35, 36, 38 and 40 results in extension arms 30, 32, 34, 37, 39 and 41 being pushed outwardly against the resistance of springs 130, 132, 134, 137, 139 and 141, respectively. If air pressure drops the springs 130, 132, 134, 137, 139 and 141 urge the arms 30, 32, 34, 37, 39 and 41 to a retracted position, retracting the shrouds connected to the arms. In this embodiment the degree of extension of the shrouds is always directly proportional to air pressure, and the degree of extension is controlled by the springs 130, 132, 134, 137, 139 and 141. It would be possible to make the springs adjustable to some extent to accommodate changing environments of application of the vehicle. It is also possible that one cylinder (two in total) could be used for each shroud connected between the base segment 20 or cab 16 and the lead segment 22 for each shroud 15. Trailing segments would simply drop in place as they reach the limit of their travel on their respective tracks.

Figure 4A:
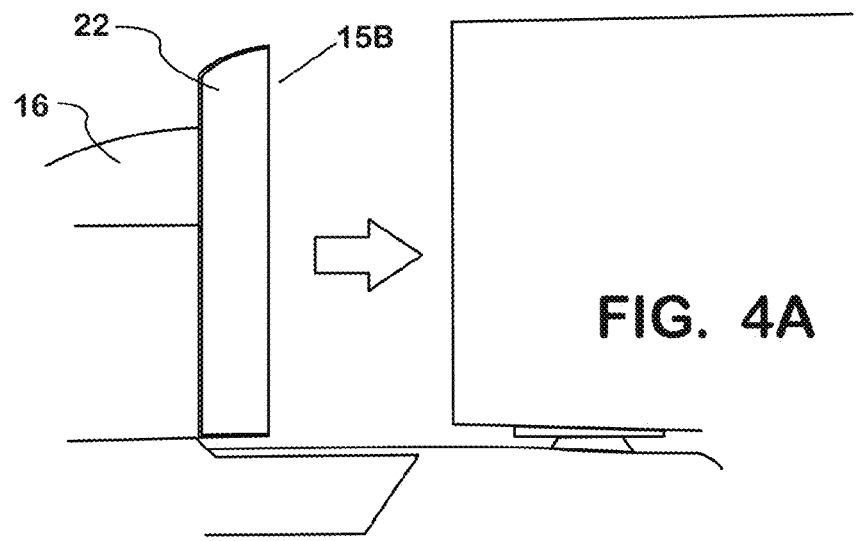
FIGS. 4A-E illustrate operation of the shroud system.
Figure 4B:
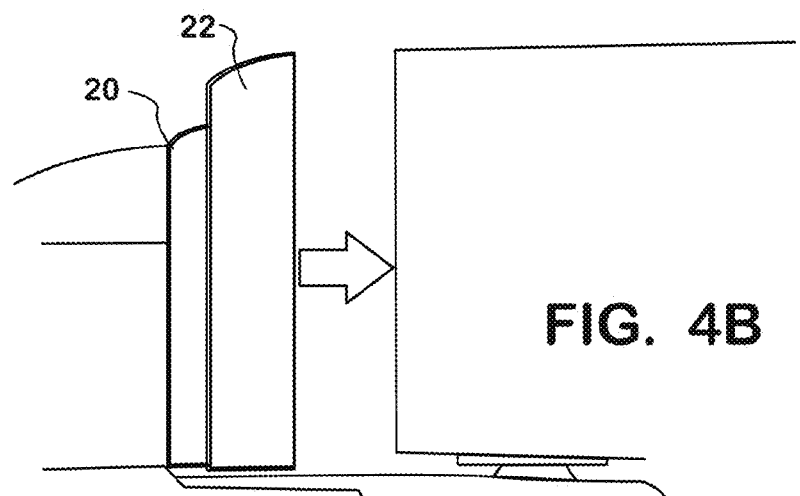
Figure 4C:
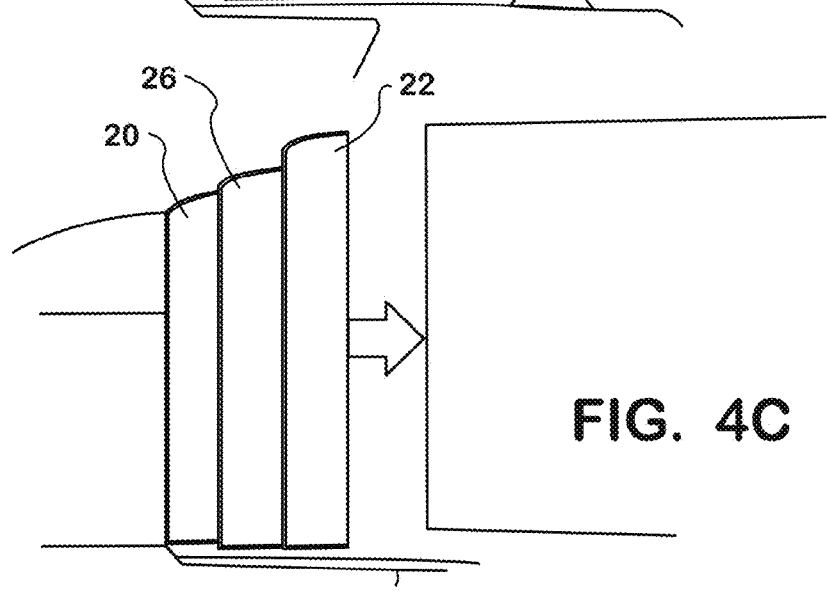
Figure 4D:
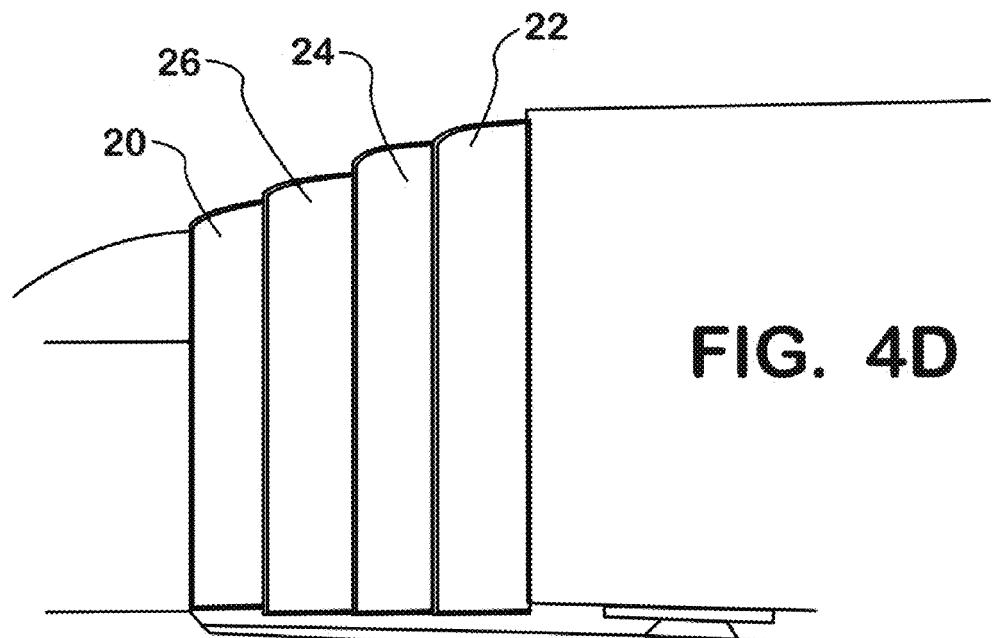
Figure 4E:
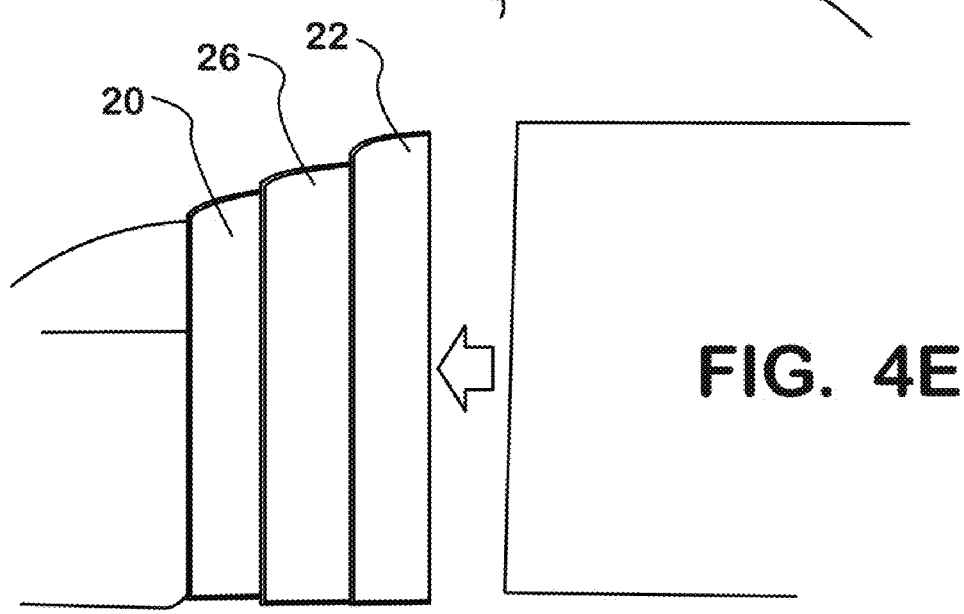

FIGS. 4A-E illustrate progressive extension and retraction of a shroud 15B on the driver's side of a vehicle. The order of extension of the segments is to be taken as representative, as the different embodiments may operate differently. For example, in the fully passive system of FIG. 3C it might be expected that the shroud segments 26, 24 and 22 would extend together and retract synchronously. Where a control system and valves are provided the order of extension and retraction can be controlled. As illustrated here the shroud 15B is initially retracted with forward segments nested within the segments which are deployable aft from the cab 16. Segments 20, 26 and 24 are inside of lead segment 22. As the shroud 15B is deployed rearward, the lead segment 22 moves to the rear. As its extension progresses the base segment 20, the second trailing segment 26 and the first trailing segment 24 are progressively revealed until the shroud is fully deployed, as shown in FIG. 4D. In FIG. 4E the beginning of reversal of the process is shown as the lead segment is withdrawn.

The present invention provides a simple, deployable aerodynamic shroud or fairing for the sides of a truck trailer combination.

While only a few preferred embodiments are described here in detail, the claims are not limited thereto, but are intended to extend to various changes and modifications thereof.

What is claimed is:

1. An autonomous power source for extensible side fairings on a vehicle comprises:
    a fluid power system comprising at least one of a rotary power mechanism, including an air screw or a turbine and a pneumatic system, including a cylinder, for generating power disposed on the vehicle to be exposed to air flowing along a side of the vehicle resulting from forward movement of the vehicle for generating power from the air flowing along the side of the vehicle; and
    a coupling mechanism actuated by power generated by the fluid power system for controlling extension of the extensible fairings.

2. An autonomous power source as claimed in claim 1, the fluid power system further comprising:
    a rotary power mechanism for converting airflow to mechanical energy; and
    a reversal mechanism allowing the rotary power mechanism to operate either to extend the fairings or retract the fairings.

3. An autonomous power source as claimed in claim 1, the fluid power system further comprising:
    a pneumatic linkage to the extensible fairings.

4. An autonomous power source as claimed in claim 3, further comprising:
    an energy storage system coupled to the pneumatic linkage and responsive to a reduction in pneumatic power for urging the extensible fairings to a retracted position.

5. An autonomous power source as claimed in claim 3, further comprising:
    springs connected between panels of the extensible fairing system for urging the extensible fairings toward a retracted position.

6. An autonomous power source as claimed in claim 1, further comprising:
    a velocity sensor; and
    an active control system responsive to the velocity sensor for controlling the fluid power system.

7. An autonomous power source as claimed in claim 6, further comprising:
    the velocity sensor being airflow responsive.

8. An autonomous power source as claimed in claim 6, further comprising:
    a vehicle articulation sensor;
    the velocity sensor being coupled to the vehicle power train;
    a fairings displacement sensor; and
    the control system being further responsive to velocity or articulation of the vehicle for adjusting extension of the extensible fairings on either or both sides of the vehicle.

9. An adjustable aerodynamic truck to trailer shroud system, the system comprising:
    driver and passenger side shrouds, the shrouds being adjustable in length and operable to be disposed in a gap extending between a back end of the tractor and a front end of the trailer;
    a fluid power system for adjusting the lengths of the shrouds;
    a speed sensor operable to sense a speed of the vehicle; and
    a control system coupled in signal communication with the speed sensor and further coupled for operation of the fluid power system, wherein the control system is operable to automatically adjust a longitudinal length of shrouds of the shrouds in response to vehicle speed.

10. The shroud system of claim 9, the fluid power system further comprising:
    a rotary mechanism for converting airflow to mechanical energy; and
    a reversal mechanism allowing the rotary mechanism to operator to operate either to extend the shrouds or retract the shrouds.

11. The shroud system of claim 9, the fluid power system further comprising:
    a pneumatic linkage to the shrouds.

12. An autonomous power source as claimed in claim 11, further comprising:
    an energy storage system coupled to the pneumatic linkage and responsive to a reduction in pneumatic power for urging the extensible shrouds to a retracted position.

13. An autonomous power source as claimed in claim 11, further comprising:
    springs connected between panels of the shrouds for urging the shrouds toward a retracted position.

* * * * *